United States Patent
Nakamura

(10) Patent No.: US 7,300,160 B2
(45) Date of Patent: Nov. 27, 2007

(54) PROJECTOR AND DRIVE CONTROL OF LIGHT SOURCE LAMP FOR PROJECTOR

(75) Inventor: Kazuyoshi Nakamura, Toyoshima-machi (JP)

(73) Assignee: Seiko Epson Corporation, Tokyo (JP)

( * ) Notice: Subject to any disclaimer, the term of this patent is extended or adjusted under 35 U.S.C. 154(b) by 324 days.

(21) Appl. No.: 10/943,852

(22) Filed: Sep. 20, 2004

(65) Prior Publication Data

US 2005/0094110 A1    May 5, 2005

(30) Foreign Application Priority Data

Sep. 29, 2003   (JP)   ............... 2003-337611

(51) Int. Cl.
*G03B 21/20*   (2006.01)
(52) U.S. Cl. ..................................... 353/85
(58) Field of Classification Search .......... 353/85, 353/52
See application file for complete search history.

(56) References Cited

U.S. PATENT DOCUMENTS

| | | | |
|---|---|---|---|
| 3,833,297 A * | 9/1974 | Swartz ..................... | 353/85 |
| 4,829,327 A | 5/1989 | Grunwald | |
| 4,964,719 A * | 10/1990 | Tachikawa et al. ......... | 353/85 |
| 6,409,350 B1 * | 6/2002 | Kakimoto et al. .......... | 353/85 |
| 6,634,757 B2 * | 10/2003 | Asakawa .................. | 353/85 |
| 7,021,772 B2 * | 4/2006 | Abe et al. ................. | 353/97 |
| 2002/0051121 A1 * | 5/2002 | Kanai ........................ | 353/85 |

FOREIGN PATENT DOCUMENTS

| | | |
|---|---|---|
| CN | 1115399 A | 1/1996 |
| JP | A 8-23501 | 1/1996 |
| JP | A 11-69264 | 3/1999 |
| JP | A 2002-300498 | 10/2002 |

* cited by examiner

Primary Examiner—Christopher Mahoney
(74) Attorney, Agent, or Firm—Oliff & Berridge, PLC

(57) ABSTRACT

A projection screen including a polarized-light selective reflection layer having a cholesteric liquid crystalline structure that causes selective diffuse-reflection of a specific polarized-light component, and a substrate for supporting the polarized-light selective reflection layer. The polarized-light selective reflection layer includes three partial selective reflection layers, each of which contains molecules of a liquid crystal made from an organic compound, forming an organic film as a whole, and has a cholesteric liquid crystalline structure that causes selective diffuse-reflection of a specific polarized-light component. Each partial selective reflection layer of the polarized-light selective reflection layer is ordered according to wavelength of the range of light reflected. Beginning from the observation side, the order is as follows: blue (B) color wave range, green (G) color wave range, and red (R) color wave range.

8 Claims, 6 Drawing Sheets

PROJECTOR AND DRIVE CONTROL OF LIGHT SOURCE LAMP FOR PROJECTOR

BACKGROUND OF THE INVENTION

1. Field of the Invention

The present invention relates to a projector and drive control of a light source lamp included in the projector.

2. Description of the Related Art

Projectors have been used widely to project an expanded image on a screen. The projectors are used under various conditions on the lightness of working environment, the focal length of a projection lens, and the projection distance. A number of techniques have been proposed to regulate the brightness and the contrast ratio of a projected image according to these parameters for the good viewability of the projected image.

For example, a technique disclosed in Japanese Patent Laid-Open Gazette No. 8-23501 drives a zoom mechanism of a projection lens according to the luminance of a screen and varies the size of a projected image to regulate the brightness and the contrast ratio of the projected image.

A technique disclosed in Japanese Patent Laid-Open Gazette No. 11-69264 regulates the brightness and the contrast ratio of a projected image according to the zoom ratio of a projection lens.

A technique disclosed in Japanese Patent Laid-Open Gazette No. 2002-300498 controls the voltage of a light source lamp and the contrast of an input video signal according to the lightness of a room, the projection distance, the screen size, and the intensity of the input video signal to project an image of the optimum brightness on the screen.

Light source lamps included in multiple projectors of an identical model generally have slightly different performances. For example, there is a variation in luminance of illumination light emitted by the light source lamps driven with a preset driving power (lamp power). The light source lamp in one projector naturally deteriorates with time and decreases the luminance of illumination light. There is accordingly a variation in luminance of illumination light emitted by the light source lamp driven with a fixed lamp power. This leads to variations of the brightness and the contrast ratio of a resulting projected image. No techniques have been proposed to take into account such a difference among the performances of the light source lamps included in multiple projectors of an identical model or a deteriorating performance of the light source lamp in one projector.

SUMMARY OF THE INVENTION

The object of the invention is thus to restrain potential adverse effects of a variation in luminance of illumination light emitted by a light source lamp of a projector or a luminance decrease of illumination light emitted by the light source lamp deteriorating with time on the brightness and the contrast ratio of a resulting projected image.

In order to attain at least part of the above and the other related objects, the present invention is directed to a projector that uses a light source lamp to project an image on a screen. The projector includes: a measurement module that measures at least one of a brightness and a contrast ratio of the projected image; and a lamp control module that sets a driving power of the light source lamp according to a result of the measurement by the measurement module.

The brightness of the projected image may be expressed by any of various parameters, for example, lighting intensity, luminance, light flux, luminous intensity, and light volume.

The setting of the driving power of the light source lamp may be determined, for example, by a specified operation or by referring to a table representing a variation in setting value against the measurement result.

The projector of the invention controls the driving power of the light source lamp to regulate the luminance of illumination light emitted by the light source lamp, based on at least one of the brightness and the contrast ratio of the projected image. This arrangement effectively restrains the potential adverse effects of a variation in luminance of illumination light emitted by the light source lamp of the projector or a luminance decrease of illumination light emitted by the light source lamp deteriorating with time on the brightness and the contrast ratio of a resulting projected image.

The projector of the invention controls the driving power of the light source lamp to regulate the brightness and the contrast ratio of the projected image. This arrangement does not require the change in size of the projected image as in the technique of Japanese Patent Laid-Open Gazette No. 8-23501, thus enabling projection of an image with the user's desired image size.

In one preferable embodiment of the projector, the measurement module measures both the brightness and the contrast ratio of the projected image, and the lamp control module sets the driving power of the light source lamp according to both the measured brightness and the measured contrast ratio.

The projector of this embodiment ensures fine control of the driving power of the light source lamp and thereby fine adjustment of the luminance of illumination light emitted by the light source lamp.

In the projector of the invention, the greater weight may be placed arbitrarily on the brightness or on the contrast ratio of the projected image in the process of setting the driving power of the light source lamp. The weights placed on the brightness and the contrast ratio may be variable.

The lamp control module may set the driving power of the light source lamp according to a combination of the measured brightness of the projected image with the measured contrast ratio. In one preferable application of the projector, the lamp control module first sets the driving power according to the measured brightness and resets the driving power according to the contrast ratio of a newly projected image with the setting of the driving power.

The regulation of the driving power of the light source lamp first according to the brightness of the projected image and then according to the contrast ratio desirably enhances the picture quality of the projected image, compared with the regulation in the reverse order.

The setting of the driving power of the light source lamp according to the brightness of the projected image may be carried out independently of the setting of the driving power of the light source lamp according to the contrast ratio. This arrangement facilitates setting of the driving power of the light source lamp.

Alternatively the lamp control module may first set the driving power according to the measured contrast ratio and reset the driving power according to the brightness of a newly projected image with the setting of the driving power.

In one preferable embodiment of the projector having any of the above structures, the lamp control module compares the result of the measurement with a preset target value and sets the driving power to compensate for a difference between the result of the measurement and the preset target value.

This arrangement effectively regulates the luminance of illumination light emitted by the light source lamp to keep the brightness and the contrast ratio of the projected image at the levels of the respective target values.

The lamp control module may carry out feedback control to successively update the driving power of the light source lamp.

The target values of the brightness and the contrast ratio of the projected image may be set lower than output maxima of the light source lamp driven with rated power. This arrangement desirably relieves the load applied to the light source lamp and ensures the longer life time of the light source lamp than that of the light source lamp driven with the rated power.

The projector of the above embodiment may further include a target value change module that changes the preset target value.

The user may manipulate a control panel of the projector to arbitrarily change the target values of the brightness and the contrast ratio of the projected image. The target values may be changed in response to inputs from another device, such as another projector or a personal computer, connecting with the projector of the invention. The latter arrangement is especially effective for a multi-screen system that divides an image into multiple image areas and uses multiple projectors to project one huge image of substantially identical brightness. One preferable control method in this multi-screen system may specify the brightness of a projected image by a selected one among the multiple projectors as a reference brightness and set target values of the brightness of the other projectors based on the reference brightness. The target values may alternatively be set according to a luminance distribution of the video signal of an object image to be projected.

The target values may otherwise be changed automatically according to the type of the input video signal, such as a color image, a monochromatic image, a moving image, a still image, or a motion picture, and the lightness of the working environment. This arrangement enhances the convenience of the projector.

In one preferable embodiment of the invention, the projector further includes: a projection lens with zoom function; a zoom ratio input module that inputs a zoom ratio of the projection lens; and a correction module that corrects the result of the measurement with the input zoom ratio. The lamp control module sets the driving power, based on the corrected measurement result.

The zoom ratio of the projection lens changes the illumination area on the screen, so as to vary the brightness and the contrast ratio of the projected image. The projector of this embodiment sets the driving power of the light source lamp, based on the corrected value with the zoom ratio. This arrangement effectively restrains potential adverse effects of a variation in zoom ratio of the projection lens on the brightness and the contrast ratio of a resulting projected image.

In another preferable embodiment of the invention, the projector further includes: a projection distance input module that inputs a projection distance; and a correction module that corrects the result of the measurement with the input projection distance. The lamp control module sets the driving power, based on the corrected measurement result.

The projection distance changes the illumination area on the screen, so as to vary the brightness and the contrast ratio of the projected image. The projector of this embodiment sets the driving power of the light source lamp, based on the corrected value with the projection distance. This arrangement effectively restrains potential adverse effects of a variation in projection distance on the brightness and the contrast ratio of a resulting projected image. The projection distance input module may manually input the measured projection distance through the user's manipulation of a control panel or may automatically input the output value of a sensor of measuring the projection distance provided in the projector.

In one preferable application of the invention, the projector further has a control mode selector module that selects either execution or non-execution of the setting of the driving power according to the result of the measurement, in response to a user's instruction.

The control mode selector module may select either a control mode that drives the light source lamp with rated power regardless of the brightness and the contrast ratio of the projected image and a control mode that sets the driving power of the light source lamp according to the brightness and the contrast ratio of the projected image as discussed above. This arrangement enhances the convenience of the projector. There may be three or more control modes as selectable options.

In the projector of the invention, the measurement module and the lamp control module may carry out the measurement and the setting of the driving power at a given timing irrespective of a user's instruction.

The given timing irrespective of the user's instruction is, for example, at each start time of the projector. This arrangement ensures automatic regulation of the driving power of the light source lamp.

The projector of the invention is not required to have all the constituents or the arrangements discussed above but may have only part of such constituents or arrangement or an adequate combination of such constituents or arrangements. The technique of the invention is not restricted to the projector but is also attained by a control device of a light source lamp including the measurement module and the lamp control module discussed above, as well as by a drive control method of a light source lamp.

DESCRIPTION OF THE PREFERRED EMBODIMENTS

Figure 1:
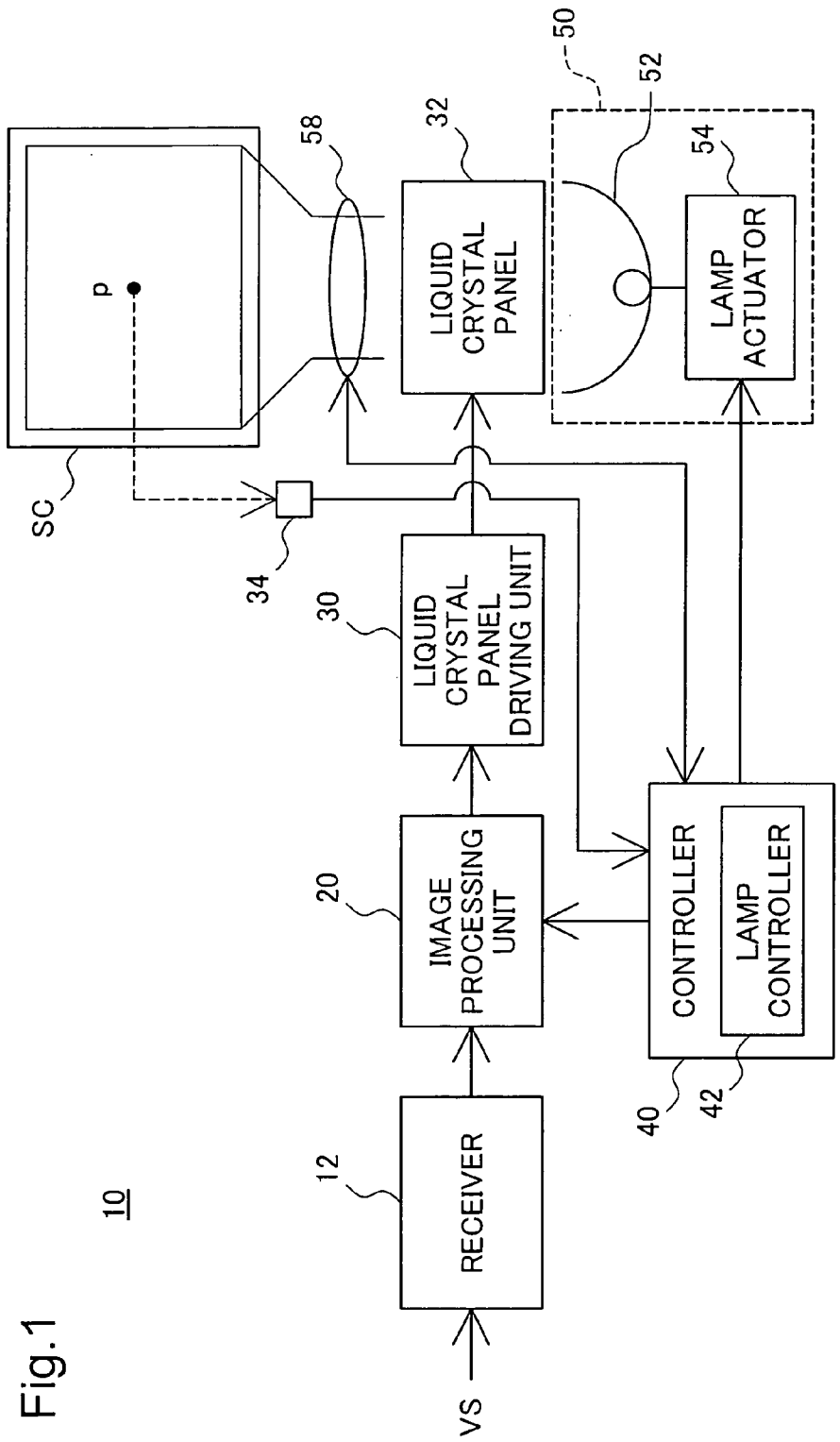
FIG. 1 schematically illustrates the structure of a projector in one embodiment of the invention.

One mode of carrying out the invention is discussed below as a preferred embodiment in the following sequence:
A. Structure of Projector
B. Adjustment of Factory Setting of Projector
C. Drive Control of Light Source Lamp
D. Modifications A. Structure of Projector FIG. 1 schematically illustrates the structure of a projector 10 in one embodiment of the invention. The projector 10 includes a receiver 12, an image processing unit 20, a liquid crystal panel driving unit 30, liquid crystal panels 32, and a controller 40. The projector 10 further includes a lighting unit 50 to illuminate the liquid crystal panels 32, a projection optical system 58 to project transmitted light through the liquid crystal panels 32 onto a screen SC, and an illumination sensor 34 to measure the illumination on the screen SC. The illumination sensor 34 measures the lighting intensity (lux) at a point 'p' on the screen SC.

The receiver 12 inputs a video signal VS supplied from, for example, a personal computer (not shown) and converts the input video signal VS into image data in a format processible by the image processing unit 20. The video signal VS may be analog video signal or digital video signal.

The image processing unit 20 causes the input image data via the receiver 12 to go through diverse series of image processing, which include image quality adjustment, for example, luminance adjustment, color balance adjustment, contrast adjustment, and sharpness adjustment, expansion and contraction of the image size, and keystone distortion correction in the case of tilt projection of the projector 10.

The liquid crystal panel driving unit 30 generates driving signals for driving the liquid crystal panels 32, based on processed image data that have gone through the series of image processing executed by the image processing unit 20.

The liquid crystal panels 32 modulate illumination light, in response to the driving signals generated by the liquid crystal panel driving unit 30. Each of the liquid crystal panels 32 is a transmission-type liquid crystal panel and functions as a light valve (light modulator) that modulates the illumination light emitted by the lighting unit 50.

The lighting unit 50 includes a light source lamp 52 and a lamp actuator 54. An ultra high-pressure mercury lamp is used for the light source lamp 52 in the structure of this embodiment, although another discharge lamp like a metal halide lamp and a xenon lamp may also be applicable.

The lamp actuator 54 varies the lamp power according to a setting value of a lamp controller 42 in the controller 40 to drive the light source lamp 52. The variation in lamp power regulates the luminance of the illumination light emitted by the light source lamp 52.

The projection optical system 58 has a projection lens with zoom functions (not shown) and actuates a zoom motor to vary the zoom ratio and change the focal length. Such functions regulate the projection area on the screen SC, that is, the size of a projected image, while focusing the projected image.

The projector 10 includes three liquid crystal panels 32 corresponding to three primary colors R, G, and B, although not specifically illustrated. The respective constituents of the projector 10 have the functions of processing image data of these three colors. The lighting unit 50 has a color separation optical system to separate white light into three color rays. The projection optical system 58 has a composite optical system to combine three color image rays to generate composite image light representing a processed color image.

The controller 40 controls the image processing unit 20 and the projection optical system 58, in response to the operator's manipulation of operation buttons provided on a remote control (not shown) and the main body of the projector 10. The controller 40 functions to set values of various parameters used in the image processing unit 20, while controlling the projection optical system 58 to vary the zoom ratio and focus a projected image.

The lamp controller 42 in the controller 40 selects one of available control modes provided in the light source lamp 52, in response to the setting of a selector switch (not shown), and controls the lamp actuator 54. The control modes available in the light source lamp 52 will be discussed later. The lamp controller 42 controls the lamp actuator 54 according to the measurement value of the illumination sensor 34, the projection distance, and the zoom ratio of the projection lens in setting of a power saving mode (discussed later) to the control mode, so as to regulate the luminance of the illumination light emitted by the light source lamp 52.

Figure 2:
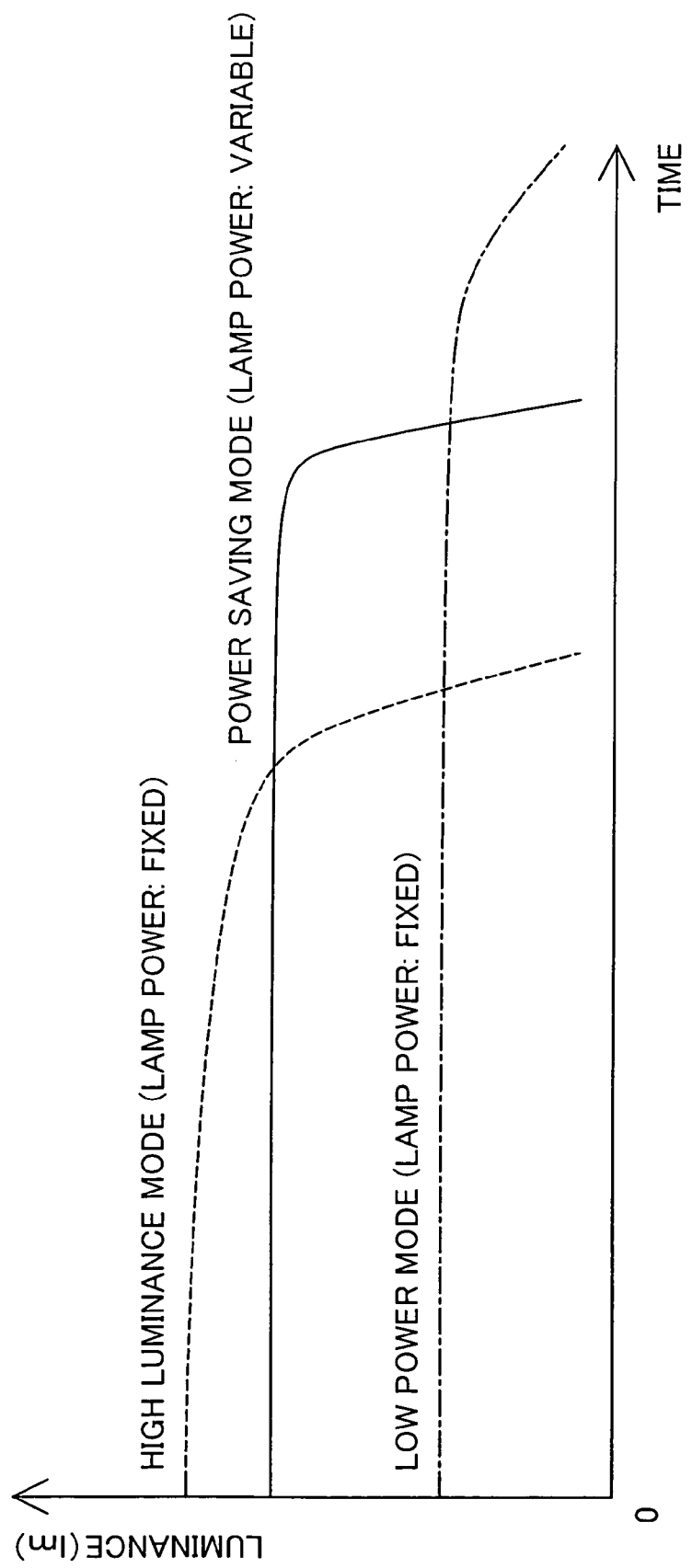
FIG. 2 shows control modes of a light source lamp selectable in the projector of the embodiment.

FIG. 2 shows the control modes of the light source lamp 52 selectable in the projector 10 of the embodiment. Three control modes, 'high luminance mode', 'low power mode', and 'power saving mode' are available in the projector 10 of the embodiment. The 'high luminance mode' is a control mode to actuate the light source lamp 52 with a fixed rated power. The 'low power mode' is a control mode to actuate the light source lamp 52 with a fixed lamp power that is lower than the rated power. The 'power saving mode' is a control mode to actuate the light source lamp 52 with variable lamp power.

As shown in FIG. 2, at the initial stage of the power saving mode, the light source lamp 52 is actuated with a lamp power that is lower than the fixed rated power of the high luminance mode. The luminance of the illumination light emitted by the light source lamp 52 at the initial stage of the power saving mode is thus lower than the luminance in the high luminance mode. The lower luminance relieves the load applied to the light source lamp 52 and ensures the longer life time of the light source lamp 52 than that in the high luminance mode. In the power saving mode, the lamp power is regulated to keep the brightness and the contrast ratio of a projected image at preset target levels.

The drive control of the light source lamp 52 in the high luminance mode and in the low power mode is substantially identical with the drive control of the conventional projector that drives the light source lamp with a fixed lamp power, and is thus not specifically described here. The following describes the drive control of the light source lamp 52 in the power saving mode in the projector 10 of the embodiment.

Figure 3:
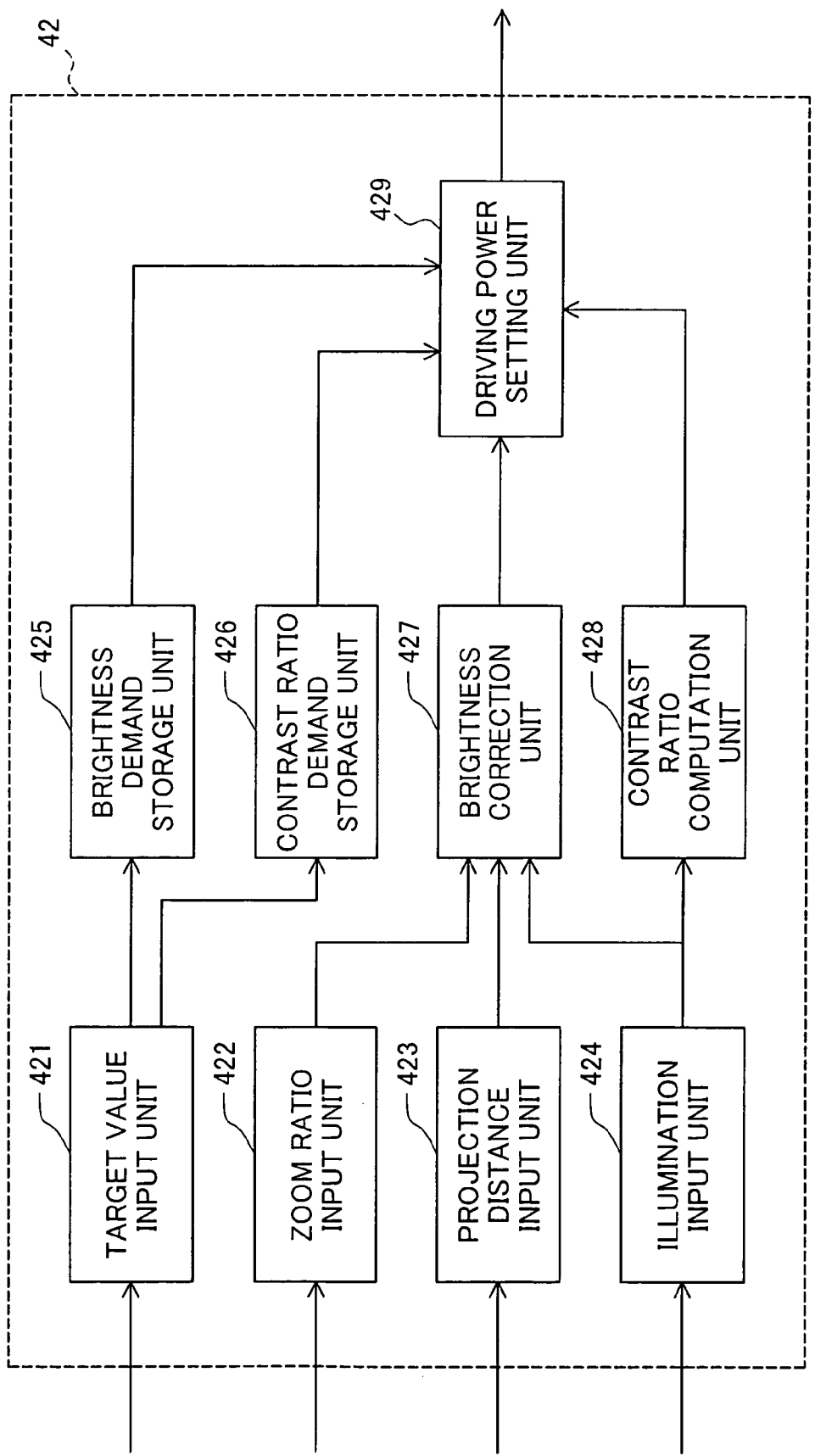
FIG. 3 is a block diagram showing functional blocks of a lamp controller in the projector of the embodiment.

FIG. 3 is a block diagram showing the functional blocks of the lamp controller 42, which may be attained by the hardware configuration or the software configuration.

A target value input unit 421 inputs target values of brightness and contrast ratio of a projected image. The target values represent the brightness demand and the contrast ratio demand of the projected image by the projector 10 in the power saving mode. Selected values are set to the brightness demand and the contrast ratio demand as the factory settings of the projector 10. The settings of these target values are varied in response to the user's manipulation of the operation buttons provided on the main body of the projector 10. The target values input into the target value input unit 421 are stored in a brightness demand storage unit 425 and a contrast ratio demand storage unit 426. In the structure of this embodiment, the target value of the brightness of the projected image is expressed in the unit of light flux (lumen).

The projection optical system 58 has a zoom ratio measurement sensor to measure the zoom ratio of the projection lens. A zoom ratio input unit 422 inputs the zoom ratio of the projection lens measured by the zoom ratio measurement sensor. A projection distance input unit 423 inputs a projection distance between the projection lens and the screen SC. The projection distance may be measured and set manually by the user or may be measured and set automatically by a sensor. An illumination input unit 424 inputs the lighting intensity measured by the illumination sensor 34.

A brightness correction unit 427 converts the lighting intensity (lux) input into the illumination input unit 424 to the light flux (lumen) and corrects the light flux (lumen) with the zoom ratio input into the zoom ratio input unit 422 and the projection distance input into the projection distance input unit 423 to be compared with the target value of the brightness stored in the brightness demand storage unit 425. The variations of the zoom ratio and the projection distance lead to variations of the size and the brightness of the projected image. A contrast ratio computation unit 428 computes the contrast ratio, based on measurement results of the illumination sensor 34 in the case of projection of an all white image on the screen SC and in the case of projection of an all black image on the screen SC.

A driving power setting unit 429 adjusts the lamp power to compensate for a difference between the target value of the brightness stored in the brightness demand storage unit 425 and the corrected light flux (lumen) by the brightness correction unit 427. The driving power setting unit 429 also adjusts the lamp power to compensate for a difference between the target value of the contrast ratio stored in the contrast ratio demand storage unit 426 and the computed contrast ratio by the contrast ratio computation unit 428. In the structure of this embodiment, required correction quantities of the lamp power are known relative to the deviations of the measured brightness and the measured contrast ratio of the projected image from the respective target values. The driving power setting unit 429 adjusts the lamp power according to such known relations. The driving power setting unit 429 may carry out feedback control and adjust the lamp power to keep the brightness and the contrast ratio of the projected image at the levels of the respective target values.

B. Adjustment of Factory Setting of Projector

Figure 4:
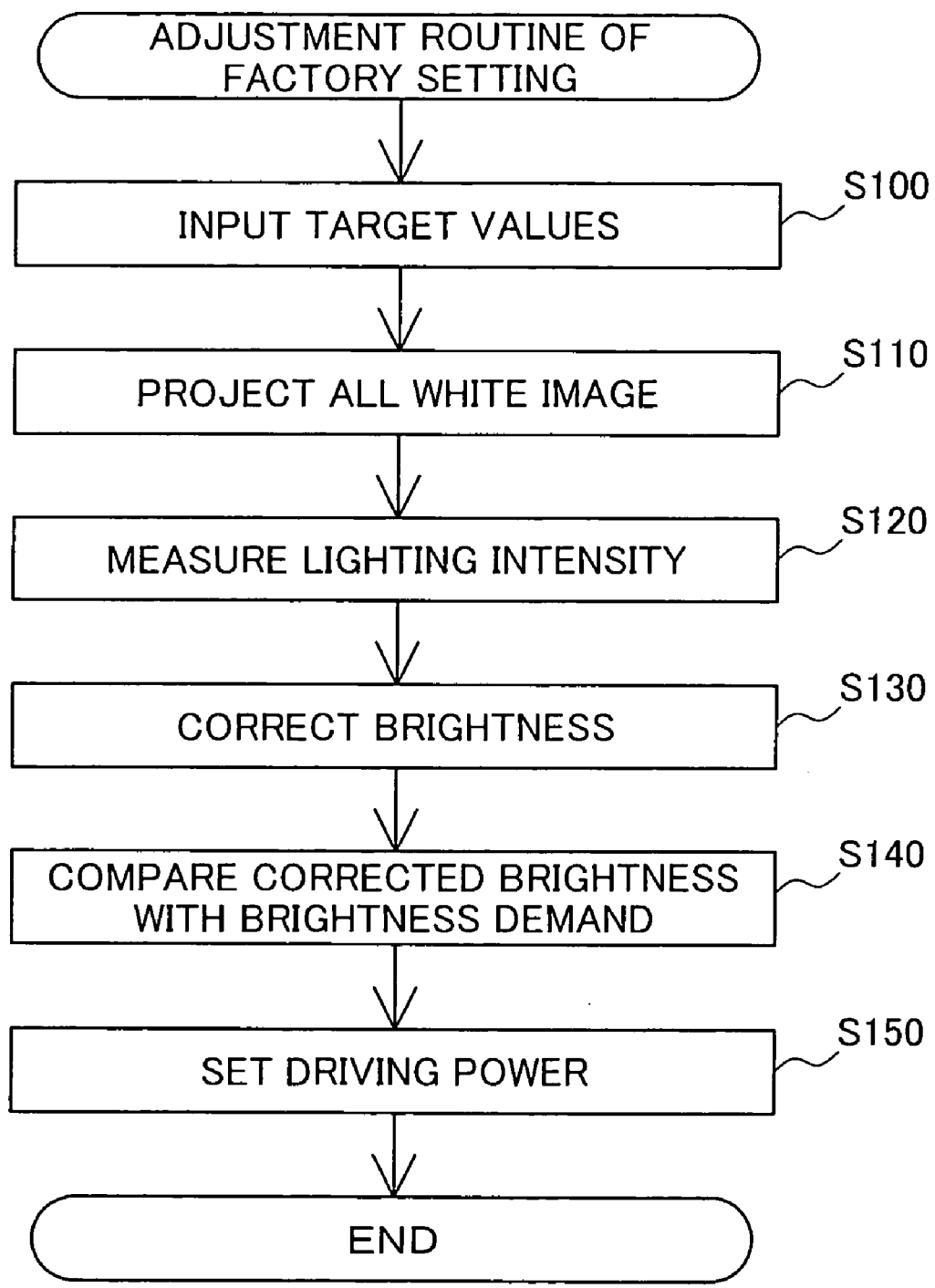
FIG. 4 is a flowchart showing an adjustment routine of factory setting of lamp power in the projector.

FIG. 4 is a flowchart showing an adjustment routine of factory setting of lamp power in the projector. The adjustment routine first inputs the target values of the brightness and the contrast ratio of a projected image in the power saving mode into the target value input unit 421, in response to an operator's manipulation of a control panel (step S100). The respective input target values are stored into the brightness demand storage unit 425 and the contrast ratio demand storage unit 426. As described previously, these target values are set lower than output levels of the projector 10 with the rated power.

The adjustment routine subsequently sets a predetermined zoom ratio and a predetermined distance to the zoom ratio of the projection lens and the projection distance, drives the light source lamp 52 with a specific driving power, which is expected to make the brightness of the projected image substantially identical with the target value of the brightness input into the target value input unit 421, in a dark room of a fixed brightness, and projects an all white image on the screen SC (step S110). A reference value is preset to the lamp power.

The adjustment routine then uses the illumination sensor 34 to measure the lighting intensity at a point 'p' on the screen SC (step S120) and activates the brightness correction unit 427 to correct the brightness (light flux) (step S130).

The adjustment routine subsequently compares the corrected brightness computed at step S130 with the target value of the brightness stored in the brightness demand storage unit 425 (step S140). When the corrected brightness is different from the target value, the adjustment routine adjusts the lamp power and sets the adjusted lamp power to the initial factory setting (step S150). This terminates the adjustment routine of factory setting. This adjustment routine is executed under fixed conditions of the zoom ratio of the projection lens, the projection distance, and the environmental lightness. Adjustment of the driving power of the light source lamp 52 based on the brightness of the projected image makes the contrast ratio substantially identical with the target value.

Such adjustment of the factory settings of the lamp power in multiple projectors 10 effectively restrains a variation in brightness of resulting projected images, due to a variation in luminance of illumination light emitted by multiple light source lamps 52 in the multiple projectors 10.

C. Drive Control of Light Source Lamp

Figure 5:
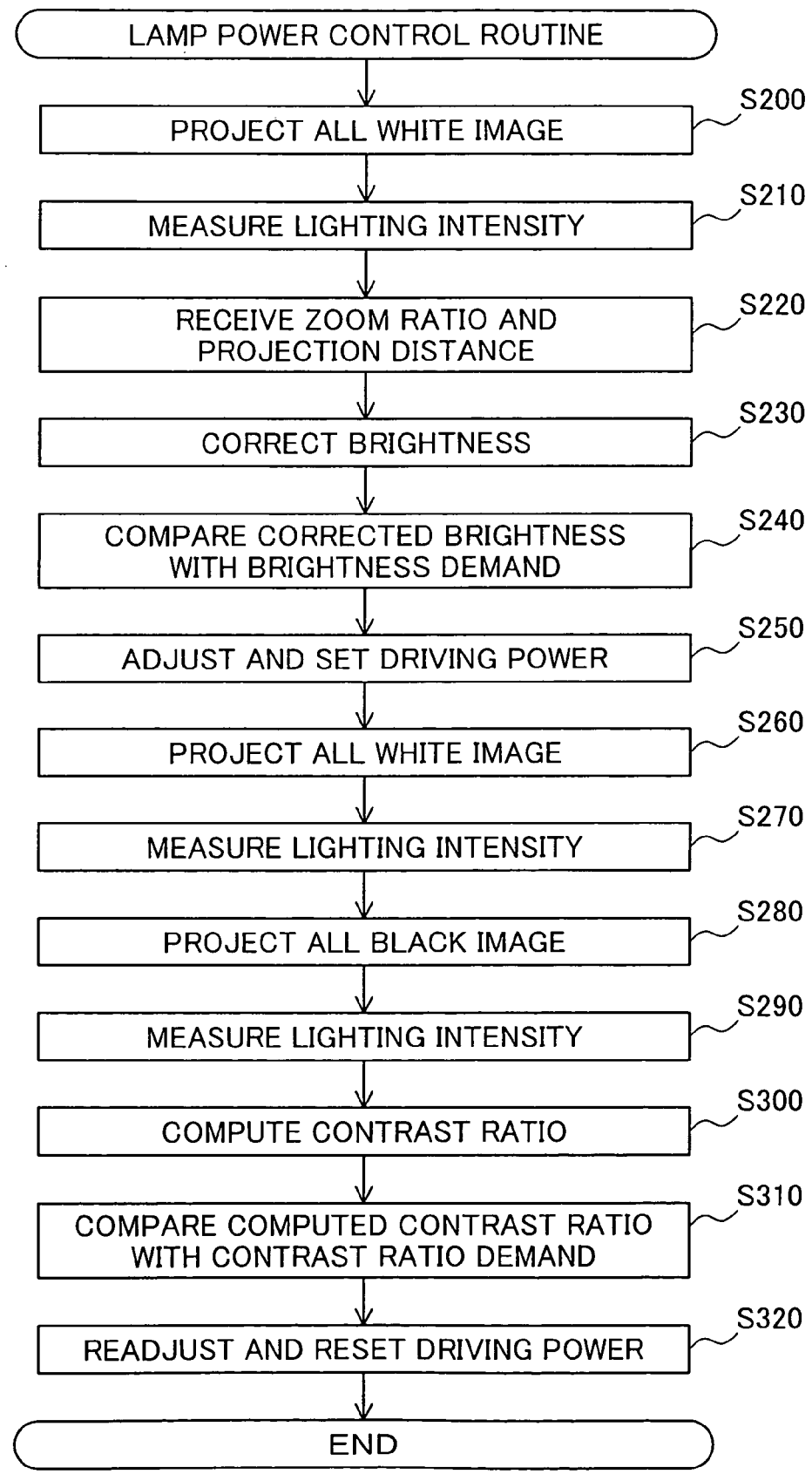
FIG. 5 is a flowchart showing a lamp power control routine in a power saving mode.

FIG. 5 is a flowchart showing a lamp power control routine in the power saving mode. The controller 40 executes this series of processing, in response to the user's selection and setting of the power saving mode to the control mode of the light source lamp 52. The procedure of this embodiment executes the lamp power control routine, irrespective of the user's execution instruction. The lamp power control routine may alternatively be activated, in response to the user's execution instruction.

The control routine first drives the light source lamp 52 with a preset lamp power for the power saving mode and projects an all white image on the screen SC (step S200), and uses the illumination sensor 34 to measure the lighting intensity at the point 'p' on the screen SC (step S210).

The control routine then receives the zoom ratio of the projection lens and the projection distance input into the zoom ratio input unit 422 and the projection distance input unit 423 (step S220), and activates the brightness correction unit 427 to convert the lighting intensity measured at step S210 into the light flux and correct the brightness of the projected image with the zoom ratio and the projection distance received at step S220 (step S230).

The control routine subsequently compares the corrected brightness computed at step S230 with the target value of the brightness stored in the brightness demand storage unit 425 (step S240). When the corrected brightness is different from the target value, the control routine adjusts and sets the lamp power (step S250).

The control routine drives the light source lamp 52 with the lamp power set at step S250 and projects an all white image again on the screen SC (step S260), and uses the illumination sensor 34 to measure the light intensity at the point 'p' on the screen SC (step S270). The control routine then projects an all black image on the screen SC (step S280) and measures the lighting intensity in the same manner as step S270 (step S290). The control routine activates the contrast ratio computation unit 428 to compute the contrast ratio based on the lighting intensities measured at step S270 and S290 (step S300).

The control routine subsequently compares the computed contrast ratio with the target value of the contrast ratio stored in the contrast ratio demand storage unit 426 (step S310). When the computed contrast ratio is different from the target value, the control routine readjusts and resets the lamp power (step S320). The readjusted and reset lamp power is stored as the setting value, which is used at step S200 in a next cycle of this control routine in response to a next selection of the power saving mode. This terminates the lamp power control routine.

The drive control of the light source lamp 52 effectively restrains a variation in brightness of a resulting projected image, due to deterioration of the light source lamp 52 with time and a resulting luminance decrease of illumination light emitted by the light source lamp 52 in one projector 10.

D. Modifications

The embodiment discussed above is to be considered in all aspects as illustrative and not restrictive. There may be many modifications, changes, and alterations without departing from the scope or spirit of the main characteristics of the present invention. Some examples of possible modification are given below.

D1. Modified Example 1

The procedure of the embodiment compares the measurement results with the preset target values to set the driving power of the light source lamp 52. This is, however, not restrictive at all. The general requirement of the invention is to measure at least one of the brightness and the contrast ratio of a projected image on the screen and set the driving power of the light source lamp according to the measurement result. The setting of the lamp power may thus be determined by a specified operation or by referring to a table representing a variation in setting value against the measurement result.

D2. Modified Example 2

In the embodiment discussed above, the drive control of the lamp power in the power saving mode sets the driving power of the light source lamp 52 according to both the measured brightness and the measured contrast ratio of the projected image. The driving power of the light source lamp 52 may alternatively be set according to only either one of the measured brightness and the measured contrast ratio of the projected image.

D3. Modified Example 3

In the embodiment discussed above, the drive control of the lamp power in the power saving mode first regulates the lamp power according to the measured brightness of the projected image and then re-regulates the lamp power according to the measured contrast ratio of the projected image. The order of regulation may be inverted. The regulation of the lamp power first according to the brightness of the projected image and then according to the contrast ratio of the projected image, however, desirably enhances the picture quality of the projected image, compared with the regulation in the reverse order.

D4. Modified Example 4

Figure 6:
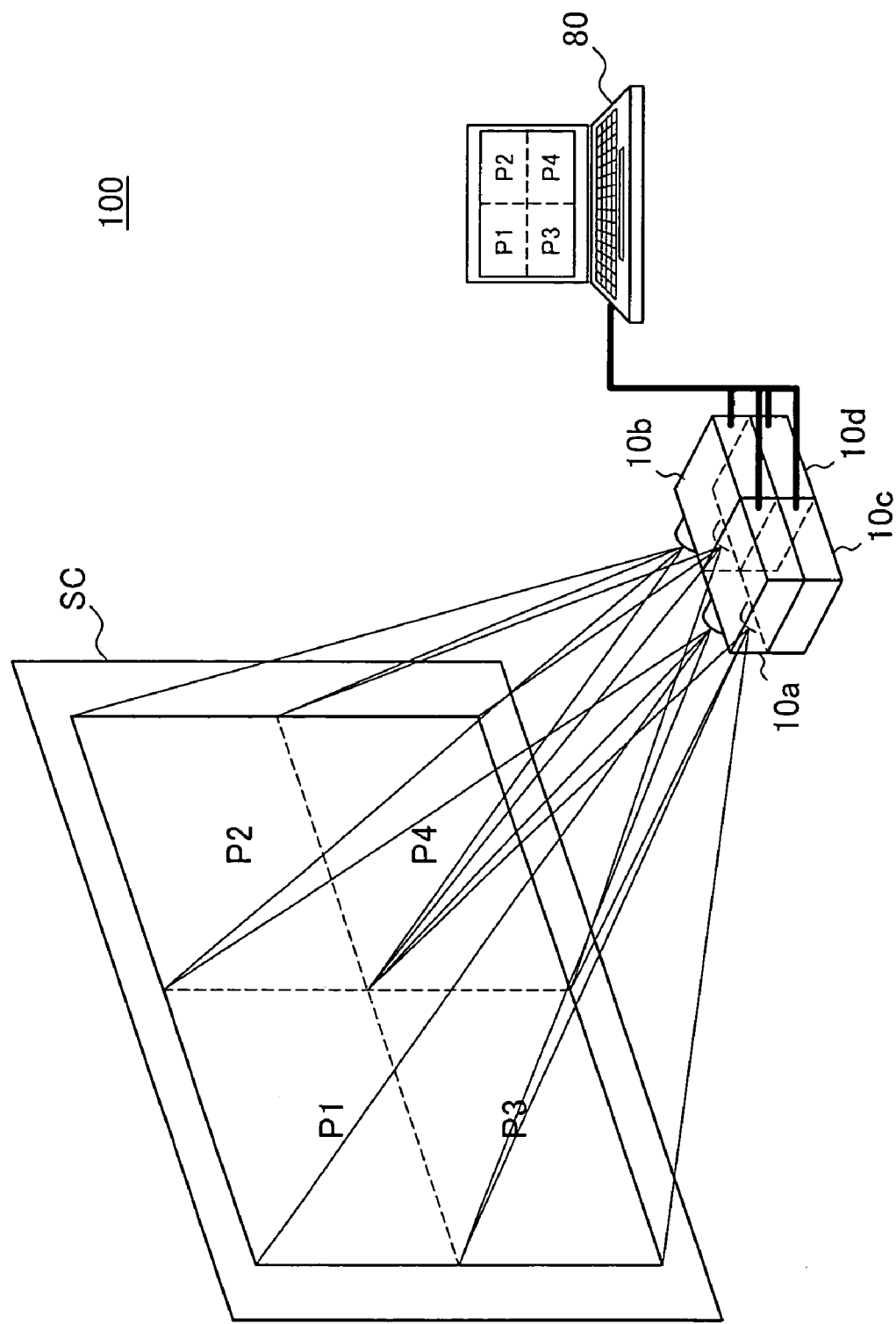
FIG. 6 shows the structure of a multi-screen system.

FIG. 6 shows the structure of a multi-screen system 100. The multi-screen system 100 includes a personal computer 80 and four projectors 10*a* through 10*d* connecting with the personal computer 80. In the multi-screen system 100, the personal computer 80 divides an object image to be projected into four image areas P1 through P4 and actuates the four projectors 10*a* through 10*d* to project one huge image on a screen SC.

The projector 10 of the invention is applied to the four projectors 10*a* through 10*d*. The personal computer 80 sets identical target values to the brightness and the contrast ratio of projected images in the four projectors 10*a* through 10*d*. The target values may be set according to measurement results of any one of the four projectors 10*a* through 10*d* or according to mean values of the measurement results of the four projectors 10*a* through 10*d*. The target values may otherwise be set, irrespective of the measurement results of the four projectors 10*a* through 10*d*.

This arrangement does not depend upon the image processing but enables the four projectors 10*a* through 10*d* to project images of the substantially identical brightness and identical contrast ratio by regulation of the lamp power.

All changes within the meaning and range of equivalency of the claims are intended to be embraced therein. The scope and spirit of the present invention are indicated by the appended claims, rather than by the foregoing description.

Finally, the present application claims the priority based on Japanese Patent Application No. 2003-337611 filed on Sep. 29, 2003, which is herein incorporated by reference.

What is claimed is:

1. A projector that uses a light source lamp to project an, image on a screen, the projector comprising:
   a measurement module that measures at least one of a brightness and a contrast ratio of the projected image; and
   a lamp control module that sets a driving power of the light source lamp according to a result of the measurement by the measurement module, wherein the lamp control module first sets the driving power according to the measured brightness and resets the driving power according to the contrast ratio of a newly projected image with the setting of the driving power.

2. A projector in accordance with claim 1, wherein the lamp control module compares the result of the measurement with a preset target value and sets the driving power to compensate for a difference between the result of the measurement and the preset target value.

3. A projector in accordance with claim 2, the projector further comprising:
   a target value change module that changes the preset target value.

4. A projector in accordance with claim 1, the projector further comprising:
   a projection lens with zoom function;
   a zoom ratio input module that inputs a zoom ratio of the projection lens; and
   a correction module that corrects the result of the measurement with the input zoom ratio,
   wherein the lamp control module sets the driving power, based on the corrected measurement result.

5. A projector in accordance with claim 1, the projector further comprising:
   a projection distance input module that inputs a projection distance; and
   a correction module that corrects the result of the measurement with the input projection distance,
   wherein the lamp control module sets the driving power, based on the corrected measurement result.

6. A projector in accordance with claim 1, the projector further comprising:
   a control mode selector module that selects either execution or non-execution of the setting of the driving power according to the result of the measurement, in response to a user's instruction.

7. A projector in accordance with claim 1, wherein the measurement module and the lamp control module carry out the measurement and the setting of the driving power at a given timing irrespective of a user's instruction.

8. A drive control method of a light source lamp included in a projector that projects an image, the drive control method comprising: measuring at least one of a brightness and a contrast ratio of the projected image; and
   setting a driving power of the light source lamp according to a result of the measurement, wherein the driving power is set according to the measured brightness and the driving power is reset according to the contrast ratio of a newly projected image with the setting of the driving power.

* * * * *